S. ALUNAN.
HAND WEEDER.
APPLICATION FILED FEB. 19, 1914.
1,142,869.
Patented June 15, 1915.
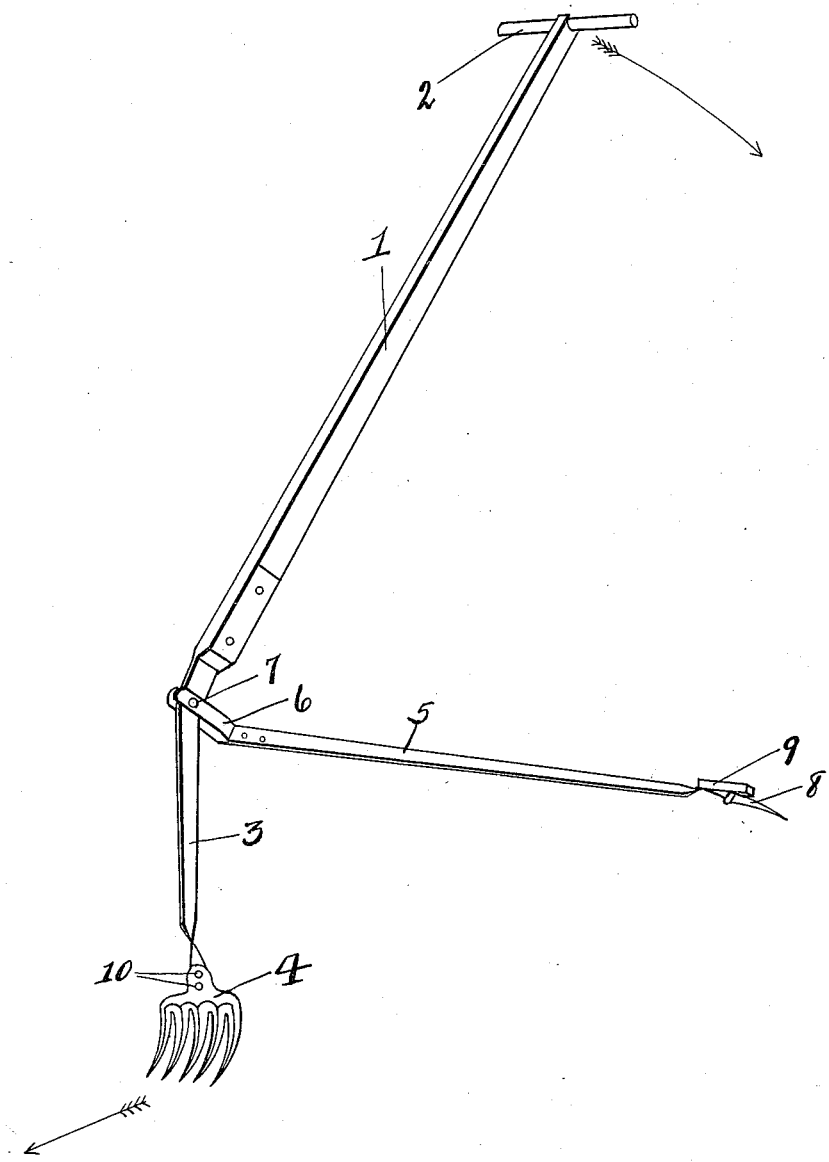
Witnesses
L. A. Williams
Wm H De Lacy
Inventor
Salvador Alunan
By Geo. P. Kimmel,
Attorney
THE NORRIS PETERS CO., PHOTO-LITHO., WASHINGTON, D. C.

UNITED STATES PATENT OFFICE.

SALVADOR ALUNAN, OF JARO, PHILIPPINE ISLANDS.

HAND-WEEDER.

1,142,869.

Specification of Letters Patent. Patented June 15, 1915.

Application filed February 19, 1914. Serial No. 819,855.

*To all whom it may concern:*

Be it known that I, SALVADOR ALUNAN, a citizen of the Philippine Islands, residing at Jaro, in the Province of Iloilo, Philippine Islands, have invented certain new and useful Improvements in Hand-Weeders, of which the following is a specification.

This invention relates to improvements in cultivating devices, and more specifically to hand weeders.

The object of my invention is to provide a device for digging out weeds, especially for use in tropical climates where the growth is rapid and the roots run so deep into the ground that their removal by hand is not only extremely difficult and tiring, but as such method merely removes the surface growth, the weeds are soon as thick and as injurious to growing crops as ever.

My invention provides the means for digging out the weeds in a way to take out the roots thereof, and this more rapidly and with less expenditure of physical effort than the former unsatisfactory methods.

In my device I particularly desire to use a weeder, but the weeder is removably mounted and may therefore be replaced by other cultivating implements, such as a hoe blade, a plow-share, and the like.

Other objects of this invention, not at this time more particularly enumerated, will be clearly understood from the detailed description and drawing forming a part of this specification.

Furthermore, this invention consists in the novel arrangement and combination of parts more particularly described in the following specification and embodied in the claim appended hereunto and forming a part of this application.

Referring now to the drawings which are merely illustrative of my invention, and which form a part of this specification: the figure is a perspective of my device with handle in raised position.

Referring further to the drawing, 1 designates a lever, having a handle 2 at one end arranged transversely thereof, and having an arm 3 secured at its opposite end, said arm being fixed at an oblique angle relative to said lever 1 and forming a continuation thereof. At the free end of said arm is removably mounted a weed fork 4 or other agricultural implement by means of bolts indicated at 10. An anchor rod 5 having a bifurcated carrier 6 on one end, forms a fulcrum for said lever and arm by means of a pivotal bearing 7 located at a convenient point upon said arm 3, preferably near its point of jointure with said lever, said pivotal bearing passing through said bifurcated carrier and said arm. At the free end of said anchor rod 5 is fixed a pronged member 8 for the purpose of engaging with the earth, while at a certain distance from the end of said pronged member and arranged transversely thereof, is mounted a block 9 to regulate the depth to which said pronged member may sink into the earth.

To operate my weeder, the lever 1 is first raised, and in that position the operator places the weed fork 4 in front of the weed to be removed, that is, on the side nearest the operator. As the lever is pulled downwardly the pronged member 8 engages with the earth and the weed fork is forced somewhat downwardly and forwardly, thus removing the weed and roots with very little effort. The pressure on the handle 2 may be regulated by the operator as to cause the implement being used to move either downwardly and forwardly, or forwardly only, thereby making a furrow of even depth when a plow-share is mounted upon the arm 3.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claim.

What I claim as my invention, and desire to secure by Letters Patent is:

In a hand weeder, in combination, an anchor rod, an earth-engaging prong member secured upon the lower end of said rod, a block mounted transversely on said rod adjacent the upper portion of said earth-engaging prong member, a bifurcation formed upon the other end of said rod, a bearing interposed between said bifurcation, a shank pivotally mounted upon said bearing, a forked member mounted upon one end of said shank, and a lever handle mounted upon the other end of said shank and disposed at an angle thereto.

In testimony whereof I affix my signature in presence of two witnesses.

SALVADOR ALUNAN.

Witnesses:
ZOIC FIONGIO,
PEDRO MORALES.